A. C. HARMAN.
FARM GATE LATCH.
APPLICATION FILED JUNE 27, 1917. RENEWED JUNE 27, 1919.
1,312,479.
Patented Aug. 5, 1919.
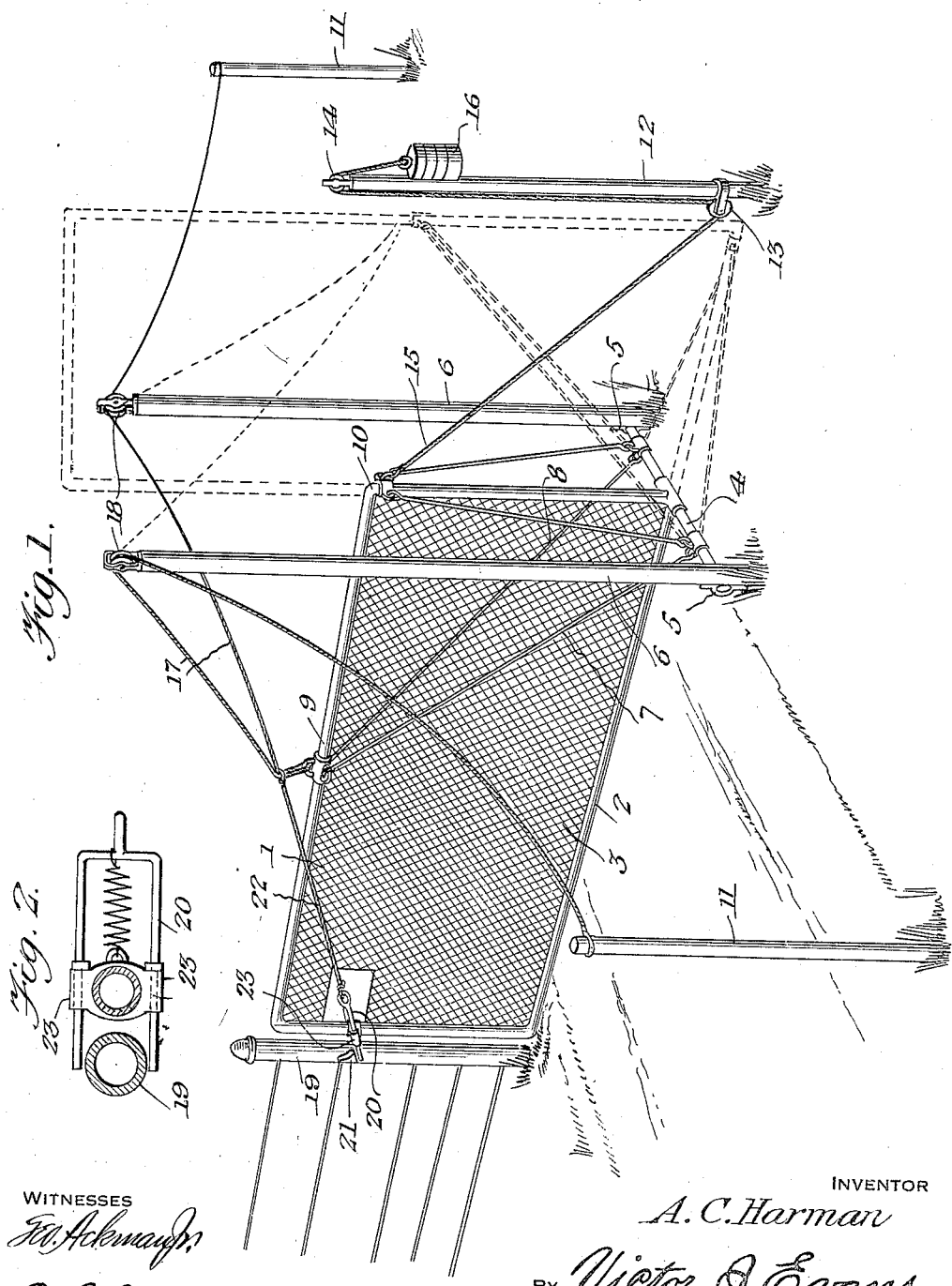

UNITED STATES PATENT OFFICE.

ARTHUR C. HARMAN, OF DELTA, IOWA.

FARM-GATE LATCH.

1,312,479.  Specification of Letters Patent.  Patented Aug. 5, 1919.

Application filed June 27, 1917, Serial No. 177,362. Renewed June 27, 1919. Serial No. 307,255.

*To all whom it may concern:*

Be it known that I, ARTHUR C. HARMAN, a citizen of the United States, residing at Delta, in the county of Keokuk and State of Iowa, have invented new and useful Improvements in Farm-Gate Latches, of which the following is a specification.

This invention relates to improvements in tilting farm gates and contemplates the provision of a tilting gate which may be more conveniently opened and closed from a distance.

Other objects are to adapt the latch of the gate for release in the actuation of the opening and closing device provided, and to simplify and render less expensive the construction of the gate.

With these and other purposes in view, I have incorporated my invention in the form shown in the accompanying drawings, described in the specification below and set forth in the appended claim.

In the drawings—

Figure 1 is a perspective view of the gate in the closed position, having the open position indicated by dotted lines; and Fig. 2 shows in detail, the latch for securing the gate in closed position.

Having more specific reference to the drawings, the gate proper 1, is shown as constructed in the manner commonly adopted of tubing or pipe constituting a frame 2 having wire mesh 3 stretched thereon to more completely close the gateway. Properly secured to the frame 2 transversely of a lower corner is a rod or bar constituting a rock shaft 4 and journaled in bearings 5 carried by spaced vertical posts 6, whereby the gate is adapted for swinging or tilting movement between the posts 6 in a vertical plane. Suitable braces 7 and 8 are connected toward each end of the rock shaft, and extend upwardly for rigid attachment to the frame bar 9 intermediately of the ends and at the top inner corner 10 of the frame, respectively.

On either side of the gate and preferably alined with the posts 6 are posts 11, spaced apart from the gate a sufficient distance to permit their being readily reached without dismounting by the driver of a vehicle, while rearwardly from and alined with the gate 1, is a post 12 having a pulley 13 toward the lower end, and a second pulley 14 upwardly therefrom and preferably on a level with the top frame bar 9 of the gate. Attached to the inner top corner 10 of the gate is a rope 15, chain, or other flexible connecting element, extending around the pulley 13 and the pulley 14 and terminally provided with a counter-weight 16 for balancing the gate. Attached intermediately of the gate bar 9 are similar connecting elements, shown as ropes 17, extending around pulleys 18 properly secured to the upper ends of the posts 6, each rope having terminal attachment to a respective post 11, whereby it is disposed for convenient manual actuation to open and close the gate. For securing the gate in the closed position and preventing lateral movement, suitable means are provided, here shown as a post 19 adjacent the end of the gate in the closed position, and adapted to be embraced by a U-shaped latch 20 pivotally mounted on the outer end bar of the gate, and having projections 21 on each side for engagement with the latch 20. These projections are provided with upper inclined surfaces which are located in the path of the latch when the gate is being closed. The contact with the ends of the latch with these inclined surfaces serve to automatically retract the said latch to permit of its passing the projections and engaging therebeneath. A suitable spring may be utilized for maintaining the latch 20 in the engaging position and to disengage the latch 20 convenient connecting means illustrated as a rope 22 and attached to the latch 20 and the ropes 17, whereby in the actuation of either rope 17 to open the gate the latch will be released.

Positioned upon the outer end bar of the gate is a plate provided with a central aperture for the reception of this bar and having upon opposite sides of the latter sleeves 23, which are adapted to guide the arms of the U-shaped latch 20, the said sleeves being disposed at the proper inclination to permit ease of operation.

In operation, to open the gate a rope 17 is pulled, releasing the latch 20 and assisted by the weight 16, raising the gate to a balanced position past which it is carried by momentum and into a vertical open position by its weight. In the open position the point of attachment of the ropes 17 is reversed relatively to the pulleys 18, whereby upon again pulling on a rope 17, the gate is raised to the balanced position and carried beyond as before, by momentum and descends into the closed position, the counter weight 14 serving to check the descent.

It is to be understood that the present embodiment of the invention is intended merely for purposes of illustration and is not to be interpreted as limiting the spirit of the invention, it being apparent that many and varied forms may be constructed without exceeding the scope of the accompanying claim.

Having thus described my invention, what I claim is:—

The combination with a swinging member and an abutment for said member, of a U-shaped spring actuated latch carried by said member and engageable upon each side of the abutment, cam projections also positioned upon each side of said abutment in the path of the latch to automatically retract the latter and means for releasing the latch.

In testimony whereof I affix my signature.

ARTHUR C. HARMAN.

Copies of this patent may be obtained for five cents each, by addressing the "Commissioner of Patents, Washington, D. C."